Figure 3:
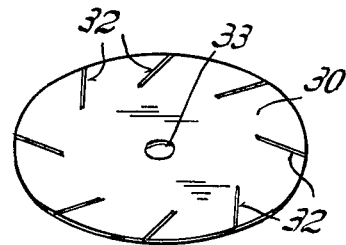

United States Patent [19]
Erb et al.

[11] 3,993,246
[45] Nov. 23, 1976

[54] NEBULIZER AND METHOD

[76] Inventors: Elisha W. Erb, 444 Main St., Fitchburg, Mass. 01420; Darrel R. Resch, 30 Walnut St., Leominster, Mass. 01453

[22] Filed: June 19, 1975

[21] Appl. No.: 588,353

[52] U.S. Cl. .................................. 239/8; 239/411; 239/434; 239/533.14
[51] Int. Cl.² ..................................... B05B 17/04
[58] Field of Search ............... 239/8, 416, 5, 417, 239/426, 434, 452, 464, 533, 534, 535, 410–411

[56] References Cited
UNITED STATES PATENTS

| | | | |
|---|---|---|---|
| 1,436,351 | 11/1922 | Metcalfe | 239/434 X |
| 2,143,958 | 1/1939 | Pontius, Jr. | 239/434 X |
| 2,676,471 | 4/1954 | Pierce, Jr. | 239/434 X |
| 3,163,329 | 12/1964 | Mornas | 239/434 X |
| 3,441,223 | 4/1969 | Lapera | 239/535 X |
| 3,512,718 | 5/1970 | Cranage | 239/434 X |
| 3,774,842 | 11/1973 | Howell | 239/2 S |

*Primary Examiner*—John J. Love
*Attorney, Agent, or Firm*—Thomas L. Tully

[57] ABSTRACT

Pneumatic nebulizer and method for uniformly dispersing variable amounts of flowable liquid in a gas to form a stable dispersion having the appearance of a natural fog and consisting essentially of liquid particles having a maximum particle size below about 20 microns diameter and having an average particle size well below about 10 microns diameter suspended in said gas. The liquid is forced at a variable rate into a gas flow, at an angle thereto, through an orifice having a width of 0.010 or less inch to stress the liquid prior to contact with the propellant gas, and is contacted with the propellant gas as it emerges from the orifice in stressed condition for conversion into a stable dispersion having the appearance of a natural fog.

7 Claims, 9 Drawing Figures

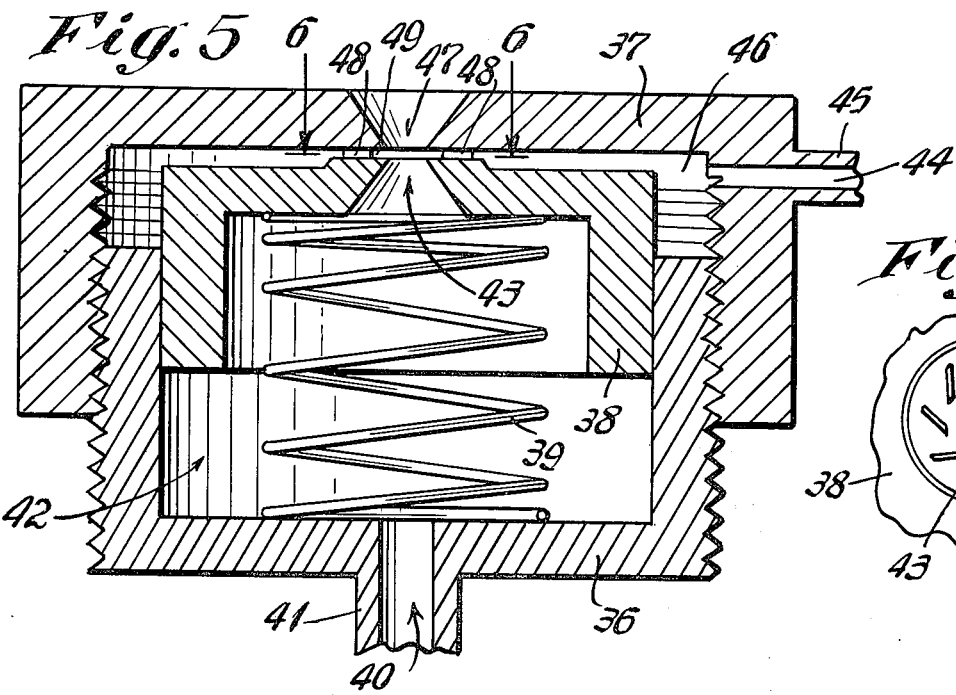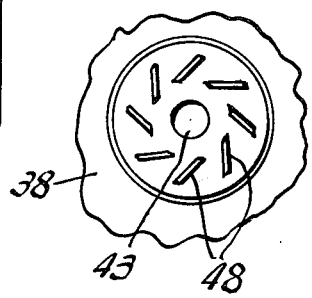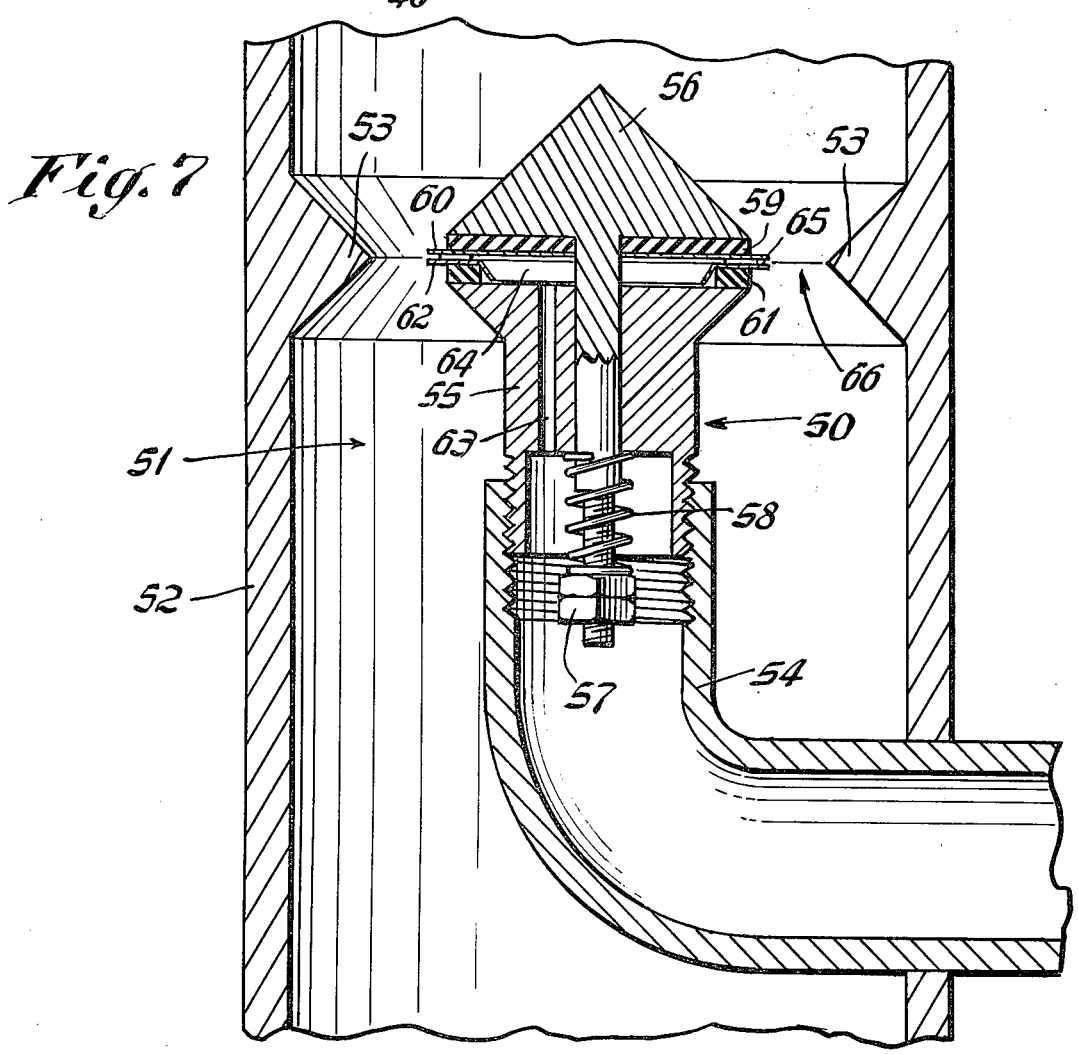

NEBULIZER AND METHOD

The present invention relates to improved pneumatic nebulizers, including carburetors, and to improve methods for producing an ultrafine stable dispersion of a flowable liquid in a gas.

A variety of pneumatic nebulizers are known to the art for the dispersion of flowable liquids in a gas. In general, such devices are based upon the atomizer principle whereby the propellant gas is forced through a narrow orifice into contact with the liquid which is fed to the outer surface of the orifice by capillary action. According to one modification of this principle, a film of the liquid is caused to gravity-flow over the outer surface of the orifice.

Such known pneumatic nebulizers have several disadvantages. From the standpoint of effectiveness, most such nebulizers fail to provide a fog in which there is not substantial fallout of liquid unless an impactor, should or other barrier is provided in the path of the emitted spray to separate out those dispersed liquid particles having particle sizes above about 50 microns. In other words, such known pneumatic nebulizers cannot directly produce a fog having dispersed liquid particles having a maximum diameter of 20 microns or less but rather produce a fog or spray having a substantial content of dispersed particles up to about 50 microns or more in size. Using water as the liquid, the particle size of the spray can be demonstrated by placing an impactor or other barrier in the path of the spray. If the spray contains liquid particles larger than about 20 microns in diameter, the fog will strike the impactor and wet its surface whereas if the spray is free of larger particles, the spray or fog will be carried around the impactor by the propellant and will not wet its surface.

Another disadvantage of such known nebulizers arises from the fact that the supply of liquid must be unconfined in order to have access to the gas orifice by means of gravity feed or capillary attraction. Thus, in their basic form, such nebulizers are limited in the extent they may be moved during operation or tilted or inverted or vibrated without causing interruption of the supply of liquid to the gas orifice and cessation of the fog.

Another disadvantage of known nebulizers is the inability to control and vary the liquid concentration in the dispersed fog, or such concentration can only be controlled and varied by varying the pressure of the propellant gas. Some nebulizers provide no control means and are unsatisfactory for use in applications where varying concentrations of liquid are required such as for various degrees of humidity, densities of paint, concentrations of fuel, and the like. In other nebulizers, concentration can be increased by increasing the pressure of the gas flow. This causes a greater volume of the gas to flow out of the nebulizer in a given period of time, which is a disadvantage in the case of confined areas being treated, such as face masks, patient tents, incubators, etc., where the increased gas volume requires compensation.

The principal object of the present invention is to provide an improved pneumatic nebulizer which is capable of directly generating an ultrafine stable fog of liquid particles having a maximum diameter of about 20 microns or less and having an average diameter of 10 microns or less in a propellant gas.

Another object of this invention is to provide an apparatus and a method for generating an ultrafine fog of liquid particles in a propellant gas whereby the total weight of the liquid particles for a given weight of the propellant gas can be varied and controlled within close limits independently of the pressure of the propellant gas.

Another object according to one embodiment of the present invention is to provide a pneumatic nebulizer in which all the liquid supplied to the liquid orifice means is nebulized and dispersed as a stable fog, i.e. there is no liquid run-off and no drippage of liquid from the orifice means or from other parts of the nebulizer.

Another object of the present invention is to provide a pneumatic nebulizer having a confined liquid supply whereby the nebulizer may be moved, tilted, inverted or vibrated during use without interrupting the supply of liquid to the propellant gas or interfering with the fog emission.

It is yet another object according to one embodiment of the present invention to provide a pneumatic nebulizer which is suitable for producing perfect fogs of a variety of liquids having different viscosities and which contains a flexible liquid-orifice-means which is controlled by the pressure of the liquid and/or of the gas to open to the slightest degree possible to permit the liquid to flow to the gas supply, which degree varies from liquid to liquid depending upon its viscosity.

Figure 1:
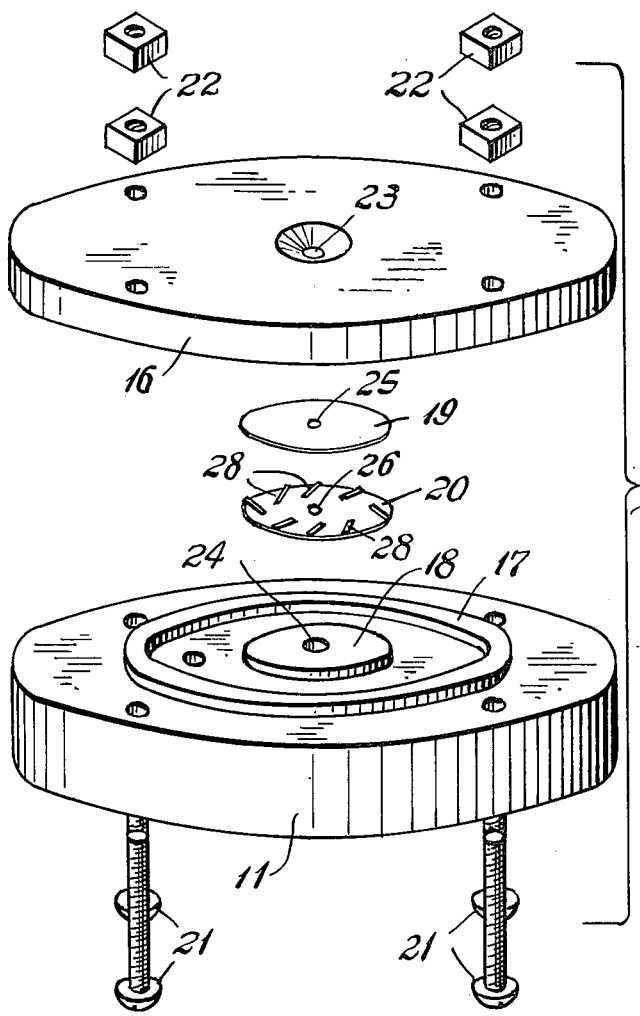
Figure 4:
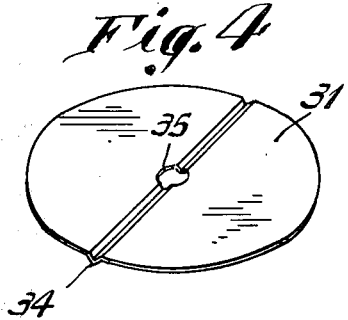
Figure 2:
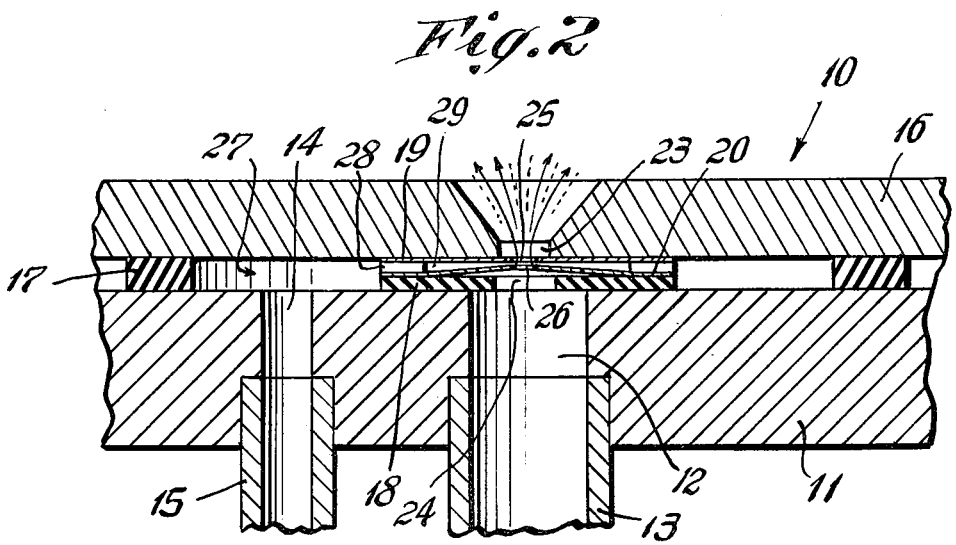
Figure 8:
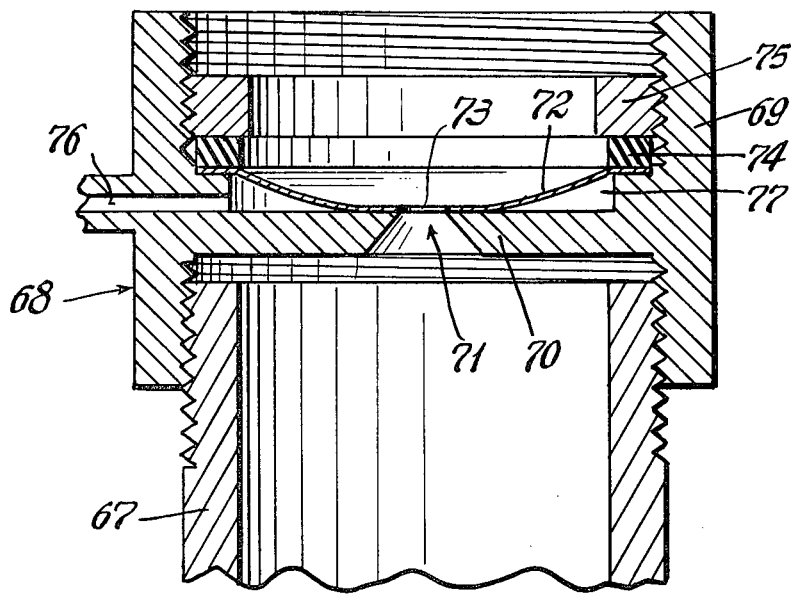
Figure 9:
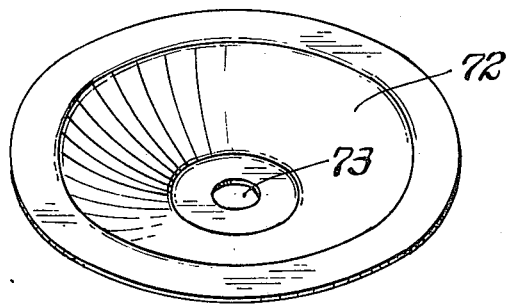

These and other objects and advantages of the present invention will be apparent to those skilled in the art in the light of the present disclosure, including the drawing in which:

FIG. 1 is a perspective view of a nebulizer assembly according to one embodiment of the present invention, the elements thereof being illustrated in spaced relation for purposes of illustration, FIG. 2 is a diagrammatic cross-section of the nebulizer device of FIG. 1, illustrating the elements in assembled position and in operation, FIGS. 3 and 4 are perspective views of nebulizer discs suitable for use in the nebulizer assembly of FIG. 1, FIG. 5 is a diagrammatic cross-section of a piston-like nebulizer device according to another embodiment of the present invention, FIG. 6 is a view taken along the line 6—6 of FIG. 5, FIG. 7 is a diagrammatic cross-section of a gasoline nebulizer device, or carburetor, according to another embodiment of the present invention, FIG. 8 is a diagrammatic crosss-section of a depressed disc nebulizer according to yet another embodiment of the present invention, and FIG. 9 is a perspective view of the disc used in the nebulizer of FIG. 8.

The present invention is based upon a number of principles and discoveries which are employed in cooperative manner to provide an improved pneumatic nebulizer which accomplishes the objects and advantages discussed hereinbefore.

The most important discovery is that a liquid which is activated, immediately prior to atomization, by forcing it at a continuous, uniform force through a small orifice having the smallest width or diameter which will pass said liquid, i.e. 0.010 inch or less, forms an ultrafine fog of said liquid when released from said orifice into, and preferably at an angle substantially perpendicular to, a flow of gas.

Another related discovery is that if the liquid enters the flow of gas substantially simultaneously with the dispersion of said gas flow into a large receptacle or open space, the expansion of the gas disperses the ultrafine fog of said liquid preventing the fine particles of liquid from coalescing into large droplets.

Another related discovery is that the amount of a liquid dispersed in a gas, i.e. the density of the fog created, can be varied and controlled within close limits independently of the pressure or volume of the gas by varying the pressure of the liquid which is fed to the gas flow through a confined orifice of restricted size.

Still another related discovery is that a liquid will not drip from or form droplets beside an orifice having a width of 0.010 inch or less if a constant flow of gas of sufficient velocity is caused to contact the liquid as it exits said orifice and the flow of gas does not thereafter come into contact with any surface.

FIGS. 1 and 2 of the drawing illustrate a unitary nebulizer device adapted to be connected to pressurized sources of a liquid and a gas to cause atomization of the liquid in the form of an ultrafine stable fog. The device 10 comprises a circular base plate 11 having a central opening 12 adapted to be connected to a pneumatic conduit 13 and having an offset opening 14 connected to a liquid-supply tube 15. The base plate 11 is sealingly connected to a circular top plate 16 by means of a compressible outer ring gasket 17 and a compressible inner washer gasket 18 which sealingly confines between itself and the undersurface of top plate 16 circular nebulizer discs 19 and 20. Four bolts 21 and nuts 22 unite plates 11 and 16 with an adjustable pressure, due to the compressibility of gaskets 17 and 18. The plates 11 and 16 and gasket 18 are provided with central openings 12, 23 and 24 respectively, and the nebulizer discs are also provided with central openings 25 and 26 which are smaller in diameter than openings 23 and 24 but larger than 0.01 inch, and which form a restricted gas orifice through which the gas from the pneumatic conduit 13 must pass. All five openings are coaxial in the assembled device to form a gas-flow passage and the flow of the gas through the restricted orifice 26, 25 causes the gas to form a vena contracta at a distance beyond orifice 26 equal to one-half the diameter thereof, and then to expand in a pattern as illustrated by FIG. 2.

As illustrated, the sealed confinement of gaskets 17 and 18 between plates 11 and 16 provides a circular chamber 27 to which liquid supplied to the device through supply tube 15 has access.

The circular discs 19 and 20 with their central openings 25 and 26 are spaced from each other in the assembled device by means of shims 28 on disc 20 which have a thickness of 0.010 inch or less. The close spacing between the discs 19 and 20 provides a narrow orifice 29 between the discs in all directions, which orifice 29 has its inner opening communicating with central openings 25 and 26 of the discs and has its outer opening communicating with the circular chamber 27 between plates 11 and 16.

In operation, a gas is supplied under pressure through pneumatic conduit 13 so that it flows forcefully through openings 12, 24, 26, 25 and 23 and exits into the atmosphere, forming a vena contracta and an unobstructed flow pattern as shown by FIG. 2. A liquid is supplied under pressure through supply tube 15 to circular chamber 27 where it is sealingly confined except for escape through the narrow orifice 29 between discs 19 and 20, which orifice 29 opens into central disc openings 25 and 26 from all directions. The pressure of the liquid is sufficient to force the liquid through the orifice 29 where it undergoes severe swirling action due to the non-radial alignment of the shims 28. The liquid is believed to also undergo severe "boundary layer turbulence" due to friction with the inner surfaces of the discs 19 and 20 before escaping into the area of the central openings 25 and 26 of the discs as an excited, very thin film of the liquid having a thickness of less than 0.010 inch, such phenomenon being described in the book Introduction to Hydraulics and Fluid Mechanics, by Jones, Harper Bros., New York (1953). Such turbulence causes minute, finite masses of the liquid in the thin film to swirl and eddy in an erratic manner in all directions and with various velocities. As the liquid emerges from the orifice, each of the innumerable, minute, finite masses of the liquid has its own independent velocity and direction.

It is at this point of greatest excitement and turbulence that the thin liquid film exits orifice 29 and is exposed to the blast of the gas flow from pneumatic conduit 13. The excited, turbulent liquid film is immediately reduced to an ultrafine dispersion of liquid particles having an average diameter of 10 microns or less and carried through opening 25 by the propellant gas in the form of a stable fog. In the embodiment illustrated by FIG. 2, the thin liquid film enters the gas flow as the gas flow approaches its vena contracta and the liquid is reduced to the ultrafine dispersion. Thereafter the gas expands in a pattern, as illustrated, and flows unobstructed into the atmosphere due to the chamfered structure of orifice 23 of the top plate 16. If orifice 23 was not chamfered the gas flow might strike the inner surface of the orifice depending upon the gas pressure and the thickness of plate 16. This would cause the dispersed liquid particles to wet said surface and flow back into orifice 25 and would create a vacuum in orifice 23 above disc 19.

According to the embodiment illustrated by FIG. 2, the bottom nebulizer disc 20 is formed of a flexible thin metal which distorts under the effect of the applied gas flow to further restrict the width of the orifice 29 between the discs in the area of central openings 25 and 26, thereby producing a still finer fog. The flexibility of the disc 20 causes the disc to return to flat condition when the gas flow is cut off, and the pressure of the gas and/or the liquid can be adjusted to produce any desired degree of flex of the disc 20 and therefore any desired reduced spacing between discs 19 and 20 in the area of central openings 25 and 26.

It appears that the improved performance of the present nebulizer devices is due to a number of important cooperative features. First the forcing of the liquid from between the closely-spaced, parallel nebulizer discs 19 and 20 causes the liquid to exit into the area of the central disc openings 25 and 26 as an exceptionally thin film having a thickness of 0.010 inch or less, more preferably a thickness of 0.003 inch or less, as provided by the use of a flexible disc assembly as illustrated by FIGS. 1 and 2 of the drawing, for instance. The thin liquid film is in a prestressed condition after being forced through the narrow orifice into the area of the central disc openings, in which condition it is capable of being reduced to a multiplicity of extremely fine liquid particles.

A second cooperative feature of the present devices is the provision of a continuous gas flow at an angle to, preferably substantially perpendicular to, the direction of flow of the liquid film, which gas flow passes through the central disc openings and strikes the liquid film as it exits the orifice between the discs. The introduction of the thin liquid film into the gas flow causes the thin liquid film to be blown apart into a multiplicity of microscopic liquid particles having an average diameter of about 10 microns or less which are carried along in the gas flow.

A third cooperative feature of the present device according to a preferred embodiment of the present invention is the abrupt restriction in the gas flow provided by hole 26 in disc 20. The gas flow pattern contracts as it flows from the relatively wide area under disc 20 through the relatively narrow area of hole 26 in disc 20. The gas flow pattern continues to contract for some distance beyond disc 20. The point of greatest contraction is known as the vena contracta of the gas flow pattern and is shown in FIG. 2 as the most narrow portion of the illustrated gas flow pattern. The gas flow reaches its greatest velocity at this point of greatest contraction and thereafter the gas flow pattern diverges. Because the gas flow pattern is contracting as it leaves hole 26 in the disc 20, none of the molecules of gas which are part of the gas flow come into contact with disc 19 as the gas flow passes through hole 25. This is because holes 25 and 26 are of the same diameter and as the gas flow pattern is contracting as it leaves hole 26, the gas flow pattern will have contracted to a diameter which is slightly smaller than the diameter of hole 25 by the time it passes through hole 25. Because the gas flow flows past orifice 29 at a slight distance from it, the gas does not resist the exit of liquid from orifice 29. The present device may be operated with the fluid pressure in orifice 29 substantially below the gas pressure in opening 12.

A fourth cooperative feature of the present devices, according to a preferred embodiment of the present invention, is the unobstructed passage of the liquid-particle-carrying gas flow into the atmosphere or into a larger chamber being supplied thereby. This is accomplished by excluding from the path of the air flow any portion of the device which could be contacted by the diverging gas flow pattern. Thus if the device has a top plate or other element beyond the central discs, which would normally be contacted by the expanding gas flow the central orifice of such top plate or other element must be sufficiently large or the plate must be sufficiently thin or must be outwardly chamfered, as shown by FIG. 2, to prevent the gas flow from striking the surface of the plate or other element before it escapes into the atmosphere. If the expanding gas flow pattern strikes the surface of the plate or any other solid surface in the vicinity of the disc openings, the dispersed liquid particles will coalesce on that surface and increase in size until the surface becomes wet with the liquid and droplets form thereon. Many of said droplets are blown off of the surface on which they form by the flowing gas, thereby contaminating with relatively large droplets the fine dispersed liquid particles contained in the flowing gas. In addition, if the expanding gas flow pattern strikes the central orifice of the top plate, some of said droplets will run down the sides of the central orifice and into disc 19, eventually obstructing central opening 25. This is a second source of large liquid particles in the gas flow because the liquid which collects in the area of the central disc opening 25 enters the gas flow and sputters from the area of the central disc opening 25 under the force of the gas flow as sizable droplets.

In cases where the escaping expanding gas flow pattern strikes a surface which is in continuous, closed association with the gas orifice, i.e. with central disc opening 25 of FIGS. 1 and 2, a vacuum is created in the area adjacent the vena contracta of the gas flow and this vacuum causes the gas flow to diverge faster than it would in open space, with the result that an increased number of the dispersed liquid particles strike the surface, form droplets, etc., as discussed supra. However these disadvantages are avoided, according to the preferred embodiment of this invention, by forming the present nebulizer device in such a manner that the pattern of the escaping gas flow, containing finely divided liquid particles, is permitted to undergo its normal expansion beyond the vena contracta and into the container or atmosphere being treated without striking any obstruction.

In some instances where the atmosphere being treated is itself contained within a confined receptacle, such as in the case of automobile carburetors, face masks, etc., the advantages discussed above resulting from the unobstructed passage of the liquid-containing gas flow or fog must be compromised to some extent, but in all cases the liquid is in the form of a fine film or jet having a thickness of 0.010 inch or less when the gas flow contacts the liquid. The gas then flows into a larger area so that the gas may expand for at least some distance to permit at least a substantial percentage of the fine liquid particles to become widely dispersed.

As discussed supra the passage of the gas flow from a large space to a confined, narrow space as it passes from the space under disc 20 to a central opening 26 of the nebulizer disc 20 causes the formation of a vena contracta and then a substantial dispersement of the gas flow, with attendant reduction in gas pressure. The thin liquid film or jet is injected into the gas flow in the vicinity of the vena contracta. This appears to cause the already-thin film or jet of liquid to be torn apart by the fast moving gas in the vena contracta with resultant formation of exceptionally fine liquid particles to the apparent exclusion of liquid particles greater than about 20 microns in diameter and probably even to the exclusion of liquid particles greater than about 10 microns in diameter. The liquid particles are immediately dispersed by the expansion of the gas flow beyond the vena contracta. The emitted liquid dispersion has the appearance of a fine, stable fog.

It is an important requirement of the present invention that the gas flow must be continuous and of sufficient velocity that the liquid can be carried away from the area of the disc openings 25 and 26. Preferably the liquid supply is pressurized but this is not necessary in cases where there is a vacuum in the receptacle or atmosphere being treated such as in the case of an automobile manifold. The manifold vacuum creates a suction in the area of the gas orifice and the liquid orifice, causing the gas, i.e. air, to be sucked through its orifice and causing the liquid, i.e. gasoline, to be sucked through its orifice and dispersed into the air flow for dissolution and perfect combustion.

FIGS. 3 and 4 of the drawing illustrate other suitable flexible metal nebulizer discs 30 and 31, each of which may be substituted for lower disc 20 of the device of FIG. 1 to provide excellent results in association with the upper disc 19. It should be pointed out that the upper disc 19 may be omitted and discs 20, 30 or 31 may be used alone in association with the undersurface of top plate 16 provided that said undersurface is smooth and the central opening 23 of plate 16 has the same diameter as the central opening of said discs, such as opening 26 of disc 20.

The flexible disc 30 of FIG. 3 is provided with ridges 32 which may be formed by impressing the underside of the flexible disc in the areas shown. The height of the ridges 32 need be just sufficient to admit the fluid between the discs. The flexibility of the disc and the adjustability of the tightness of plates 11 and 16 permits the disc to be adjustably compressed and/or separated, as shown by FIG. 2, so that the width of the orifice 29 adjacent the central disc opening, 33 of disc 30, will be 0.010 inch or less.

According to another embodiment disc 30 of FIG. 3 may be a flexible or non-flexible disc provided with grooves or recesses 32 which may be formed by gouging or scratching the upper surface of the disc along its outer peripheral edge as shown. The grooves do not extend to central opening 33. The adjustability of the tightness of plates 11 and 16 permits the disc to be adjustably compressed so as to seal disc 30 against disc 19. The depth of the grooves 32 is such as to be sufficient to admit fluid from chamber 27 between disc 30 and disc 19 along their outer edge. The liquid supply pressure may be adjustably increased to cause the liquid to seep as an extremely fine film between disc 30 and disc 19 to central openings 33 and 25 where the liquid comes into contact with the gas passing through central openings 33 and 25 in discs 30 and 19. The liquid supply is totally shut off from the gas flow in this embodiment of disc 30 regardless of the pressure of the flow of gas in conduit 13 when the liquid pressure is below that required to force the liquid to seep between disc 30 and disc 19.

According to yet another embodiment disc 30 of FIG. 3 is a non-flexible disc 30 with one or more grooves or recesses which may be formed by gouging or scratching the upper surface of disc 30. The grooves extend from the peripheral edge of disc 30 to central opening 33 to provide a continuous recessed passage. The adjustability of the tightness of plates 11 and 16 permits disc 30 to be adjustably compressed, sealing disc 30 against disc 19 except for the continuous grooves across disc 30. The depth of the grooves need be just sufficient to permit the fluid to flow through the grooves. The grooves form a multiplicity of thin orifices for the passage of liquid from chamber 27 into contact with the gas flow through the central disc opening 33 of disc 30.

The flexible disc 31 of FIG. 4 is provided with a diametric crease 34 which passes through the central opening 35. The crease 34 prevents the disc 31 from lying flat against upper disc 19 of FIG. 1 so that a thin orifice space, similar to 29 of FIG. 2, is provided for the passage of the liquid from chamber 27 into contact with the gas flow. Washer gasket 18 deforms about crease 34 so as to perfectly seal disc 31 to gasket 18. The flexibility of the disc and the adjustability of the tightness of plates 11 and 16 permit the height of the crease 34 to be adjustably compressed, as shown by FIG. 2, so that the height of the thin orifice space formed by the crease will be 0.010 inch or less.

It appears that the confinement of the liquid as an ultrathin layer between two fixed, closely-spaced, parallel members such as the discs 19 and 20 of FIGS. 1 and 2, or the introduction of the liquid in the form of an ultrafine spray from jets or orifices having a maximum diameter of 0.010 inch, at the point of contact with a continuous, uniform, expanding pneumatic force, is responsible for the ultrafine size of the resulting liquid particles since the liquid is prevented from coalescing or otherwise forming into particles of larger size, as can occur when the liquid is unconfined or if the gas flow is interrupted or insufficient. Such confinement also permits the present nebulizers to be used in any position in space, including upside down, without any spillage or drippage of the liquid or any interruption of the spray activity. Thus such nebulizers are useful as hand-held devices for the spraying of paint, liquid fungicides and fertilizers and other materials where complete freedom of alteration of the spray direction is necessary.

It should be pointed out that regardless of the direction of the spray action, it is preferred that the direction of the flow of the gas be substantially perpendicular to the direction of the liquid as it exits the thin orifice. This causes the vena contracta of the gas to form in a direction perpendicular to the direction of the liquid flow in those embodiments of the present invention which utilize a vena contracta and produces the finest fog possible with the present devices.

The nebulizer of FIGS. 1 and 2 of the drawing, per se or incorporating the disc 30 of FIG. 3 in place of disc 20, can be adjusted to provide the most perfect ultrafine fog regardless of the viscosity of the flowable liquid which is being dispensed.

The use of flexible orifice means, such as the discs 20 and 30, formed of flexible impervious material such as thin steel, aluminum, plastic, or the like, and the outer peripheral location of the spaced thin shims 28 or ridges 32 adjacent the outer circumference of the discs represents a preferred embodiment of the present invention since the ability of the discs to flex to a substantially closed position against the upper disc 19 or against the undersurface of top plate 16 under the pressure of the gas flow, as illustrated by FIG. 2, causes the liquid to be supplied to the gas flow as the thinnest film possible and results in the finest and most stable fog.

In operation, the flow of gas under pressure through conduit 13 of FIG. 2 causes the lower disc 20 to be flexed up against upper disc 19 due to the restricted diameter of openings 26 in the center of the disc 20. This narrows the orifice 29 in the area adjacent center openings 25 and 26 and can cause it to close completely depending upon the gas pressure and the degree of flexibility of the discs. Next liquid is supplied under pressure through tube 15 into circular chamber 27 where it is confined, with orifice 29 as its only avenue of escape. The liquid is unable to pass through restricted or closed orifice 29 unless the pressure of the liquid is increased to force it between the discs 19 and 20, i.e. to force the orifice 29 into the smallest open position which will permit the liquid to pass through to the central opening 26 into contact with the propellant gas. Alternatively the pressure of the liquid can be maintained low and the pressure of the gas through conduit 13 can be reduced to reduce the pressure of flexible disc 20 against disc 19 and to permit the discs to separate as they attempt to return to normal flat position. As the pressure is gradually reduced, the size of the orifice adjacent opening 26 will reach a spacing, less than 0.010 inch wide, and possibly less than 0.001 inch wide at which the liquid will begin to pass therethrough for contact with the propellant gas.

Thus, for disks of any particular degree of flexibility by adjusting the pressure of the liquid and/or the pressure of the gas, a point will be reached at which the size of the orifice is the smallest possible space which will permit the liquid to pass. This is important because the greatest possible boundary layer turbulence occurs and the thinnest possible liquid film is formed under this condition and the finest possible fog is produced, regardless of the viscosity of the flowable liquid being dispensed. Low viscosity liquids such as water can be dispensed as ultrafine fogs through orifices of 0.010 inch or less in width or diameter whereas higher viscosity liquids such as heavy oils require more narrow orifices of 0.003 inch or less in width or diameter.

FIGS. 5 and 6 of the drawing illustrate a nebulizer which has a structure different than that of FIG. 1 but which produces similar results in a different manner. The nebulizer of FIG. 5 comprises a lower cylinder or cup element 36, an upper cylinder or cap element 37 which threadably engages the cup element 36, a piston element 38 which sealingly and slidably engages the inner wall of the cup element 36, and a spring 39 which retains the piston element 38 biased towards and in engagement with the undersurface of the cap element 37. The cup element 36 is provided with a gas inlet opening 40 associated with gas conduit 41 whereby gas can enter into gas chamber 42 and can escape only by passing out the central opening 43 of piston element 38.

The cap element 37 is provided with a liquid inlet 44 associated with a liquid conduit 45 whereby liquid can enter into liquid supply chamber 46 surrounding the outer upper surface of the piston element 38 and can escape only by passage between the undersurface of the cap element 37 and the top surface of the piston element 38, and out through the central opening 47 of the cap element 37, which opening is chamfered or beveled, as illustrated, in order to permit the gas flow pattern to spread unobstructed.

The top surface of the piston element 38 is provided with a series of spaced shims or ridges 48 having a maximum thickness of about 0.01 inch, preferably arranged in a non-radial direction adjacent the center opening 43, as shown by FIG. 6, whereby they maintain elements 37 and 38 spaced by a distance of 0.01 inch or less in the areas between the shims 48 to form an orifice 49 through which the liquid can pass from chamber 46, with a swirling action, to opening 47 into contact with the gas flow. The liquid forms a thin film at the center of opening 47 and explodes as an ultrafine fog upon contact with the pressurized gas flow as the gas flow forms its vena contracta.

If desired, the shims 48 may be formed of compressible material such as rubber whereby the orifice 49 can be reduced in width by the pressure of the gas flow against the underside of piston element 38 to a degree, less than 0.01 inch in width, which permits the thinnest possible film if the liquid to pass. If desired, the gas pressure may be increased to a point that liquid flow stops and then the liquid pressure can be increased gradually until the liquid flow resumes.

FIG. 7 of the drawing illustrates a carburetor nebulizer according to the present invention comprising a gasoline supply element 50 sealingly engaged within an air flow chamber 51. Chamber 51 consists of a pipe 52 such as a manifold pipe of an automobile engine having a restricted section 53. The gasoline supply element 50 is mounted within pipe 52 so as to emit gasoline at the restricted section 53 within the pipe.

Supply element 50 comprises a liquid supply conduit 54 which passes through the wall of pipe 52 to a supply of gasoline from outside pipe 52, a restricted flow member 55 which threadably engages the conduit 54, a conical cap member 56, lock nuts 57 and a spring 58 which urge the cap member 56 down against the upper surface of the restricted flow member 55.

The underside of the conical cap member 56 is provided with a gasket 59 having attached thereto a thin rigid or pliable disc 60 while the top surface of the restricted flow member 55 is provided with an outer ring gasket 61 having attached thereto a thin rigid or pliable ring disc 62 which is provided with a series of raised shims or ridges, similar to those present on disc 20 of FIG. 1, which maintain discs 60 and 62 spaced by a distance of 0.010 inch or less.

In operation, the spring 58 maintains the discs 60 and 62 so that they are held apart by the height of the ridges. When the engine is cranked to start, a vacuum is created in chamber 51, drawing gasoline through conduit 54 and air through pipe 52. The gasoline is drawn through the passage 63 in restricted flow element 55, into circular chamber 64 and out through the narrow orifice between discs 60 and 62 into the air flow.

The escaping gasoline forms a thin film within the circular space 66 between the restricted section 53 of the pipe 52 and the exit of the orifice 65 explodes as an ultrafine gasoline fog upon contact with the air flow as the air forms its vena contracta and then expands into the wider chamber of pipe 52 above the cap 56 of the supply element 50.

FIGS. 8 and 9 of the drawing illustrate still another nebulizer structure according to the present invention in which the nebulizer disc used is one which is normally flexed in closed position and will only admit pressurized liquid to pass. The device of FIG. 8 comprises a gas supply pipe 67 which threadably engages a liquid supply element 68 which, in turn, may threadably engage an extension of the air supply pipe. The liquid supply element 68 comprises a ring housing 69 having a central flow restrictor flange section 70 containing a central opening 71. A flexible nebulizer disc 72 having a central opening 73, shown more clearly in FIG. 9, is secured in position biased against the upper surface of the flange section 70 by means of a washer 74 and a ring screw 75 which threadably engages the threaded inside surface of the ring housing 69, as shown by FIG. 8.

The housing 69 is provided with a liquid inlet 76 which opens into the circular chamber 77 between the disc 72 and the upper surface of flange section 70, inlet 76 being connected to a liquid supply conduit. Liquid entering chamber 77 is prevented from escaping because of the contact between the disc 72, adjacent its opening 73, and the surface of flange section 70, adjacent its opening 71. However, when the pressure of the liquid supply to chamber 77 is increased gradually, the liquid such as water forces disc 72 out of contact with flange section 70 to provide the thinnest possible orifice therebetween, less than 0.01 inch wide. The liquid is forced through the thin orifice into the area of opening 73. If a gas such as air is forced through supply pipe 67 and through opening 73 the liquid entering into the area of opening 73 is atomized as an ultrafine dispersion upon contact with the air flow passing up through opening 71 as the air flow forms its vena contracta and then expends outwardly.

If desired, the device shown in FIG. 8 may easily be modified to cause disc 72 to move out of contact with flange 70 with increased gas flow, thereby permitting a greater volume of liquid to flow into the area of opening 73 with increased gas flow, by extending one or more protrusions from disc 72 into hole 73, partly covering opening 71, i.e. by reducing the diameter of opening 73 relative to the diameter of opening 71. The gas flowing through opening 71 will strike the protruding portion of disc 72, i.e. the portion extending over opening 71, thereby lifting disc 72 out of contact with flange 70. While the devices of FIGS. 1 and 2 of the drawing provide decreased liquid flow with increased gas pressure, the modified embodiment of FIG. 8 provides increased liquid flow with increased gas pressure.

While the devices illustrated by the various figures of the present drawing involve the use of spaced discs to provide the narrow orifice through which the liquid is supplied to the gas flow as a thin film, it should be understood that the liquid supply orifice may consist of one or more tiny holes or jets, each having a diameter of 0.010 inch or less, which permit the liquid to be introduced into the gas flow. In effect this is similar to the use of the disc 30 of FIG. 3 having continuous scratches or depressions which provide tiny continuous channels or passages through which the liquid travels to the central orifice 33.

Also, while the devices illustrated by the various figures of the present drawing involve the sudden restriction of the flow of gas from a relatively large conduit to a relatively small orifice so as to cause the gas flow pattern to form a vena contracta, it should be understood that the invention can generate a fog of fine dispersed liquid particles without the flow of gas being obstructed, that is, without the flow of gas forming a flow pattern containing a vena contracta.

If desired, the liquid orifice may consist of a restricted orifice at the end of a liquid supply conduit, such as one or more holes having a maximum diameter of 0.010 inch in a thin cap at the end of the liquid supply conduit so that the liquid is caused to restrict and form a vena contracta as the liquid is introduced into the vena contracta of the gas flow.

As will be apparent to those skilled in the art, variations may be made in the various structures illustrated by the drawing and the nebulizer disc elements of one structure may be interchanged with those of the other illustrated structures. Thus the present invention encompasses the use of fixed nebulizer jets or of nebulizer discs or plates which are used singly or in pairs, which are rigid or flexible, which are biased in open or closed position and which function with either a pressurized liquid supply or a vacuum-drawn liquid supply.

In all cases, the devices of the present invention provide a narrow orifice between closely-spaced discs or plates, or one or more small jet orifices, each orifice being 0.01 inch or less in width or spacing or diameter, and preferably is less than 0.003 inch in width or spacing or diameter, to restrict the flow of a liquid into a gas flow so that the liquid forms a thin film or thin jet within the gas flow at a point where the gas is flowing at a substantial velocity.

It should be understood that the structures of the nebulizer devices set forth in the figures of the drawing are not critical and that variations will be apparent to those skilled in the art for purposes of simplification or modification of the devices to a particular use where size, shape, appearance or other factors are to be considered.

Variations and modifications may be made within the scope of the claims and portions of the improvements may be used without others.

We claim:
1. Method for reducing a flowable liquid to an ultrafine dispersion of liquid particles in a propellant gas comprising the steps of:
   a. confining a pressurized flowable liquid within a closed chamber having, as the only means of escape, a flexible liquid orifice having a restricted width;
   b. confining a pressurized gas within a chamber having an orifice communicating with said flexible liquid orifice;
   c. adjusting the pressure of said flowable liquid and/or of said gas such that on release of both from their respective chambers said flexible liquid orifice is flexed to the smallest possible spacing which will permit said flowable liquid to flow therethrough;
   d. releasing said pressurized flowable liquid and said pressurized gas from their respective chambers to flex said liquid orifice and cause said flowable liquid to pass therethrough as a thin liquid stream having a thickness of less than about 0.010 inch which contacts said pressurized gas as it exits said orifice and is reduced to an ultrafine dispersion of particles of said liquid in said gas.

2. Method according to claim 1 in which said liquid orifice has a narrow width which will not permit the liquid to pass therethrough, and the pressure of said liquid and/or of said gas is adjusted to increase the width of said flexible orifice.

3. Method according to claim 1 in which said liquid orifice is normally open and the pressure of said liquid and/or of said gas is adjusted to reduce the width of said flexible orifice.

4. Method according to claim 1 which comprises varying the pressures of said liquid and of said gas relative to one another to vary the amount of said liquid passed through said orifice relative to the amount of said gas impinged thereagainst and vary the concentration of said liquid particles dispersed in said gas.

5. Method according to claim 1 which comprises introducing said continuous flow of gas through a restricted gas orifice so as to cause the formation of a vena contracta in said gas flow and introducing said continuous thin liquid stream into said continuous flow of gas substantially simultaneously with the formation of the vena contracta of said gas flow.

6. Method according to claim 1 which comprises introducing said continuous flow of gas through a restricted orifice so as to cause the formation of a vena contracta in said gas flow and introducing said continuous thin liquid stream into said continuous flow of gas substantially simultaneously with the formation of the vena contracta of said gas flow, and permitting said ultrafine dispersion of said liquid particles in said gas to be released directly into a larger receptacle without striking any solid surface.

7. Method according to claim 1 in which said liquid orifice is mechanically adjustable and is gradually adjusted to modify the width of said flexible orifice.

* * * * *

UNITED STATES PATENT AND TRADEMARK OFFICE
CERTIFICATE OF CORRECTION

PATENT NO. : 3,993,246
DATED : November 23, 1976
INVENTOR(S) : ELISHA W. ERB & DARREL R. RESCH It is certified that error appears in the above-identified patent and that said Letters Patent are hereby corrected as shown below:

Col. 1, line 2, delete "improve" and substitute --improved--;

Col. 1, line 18, delete "should" and substitute --shroud--;

Col. 6, line 10, delete "device" and substitute --devices--;

Col. 6, line 30, delete "a" and substitute --the--;

Col. 9, line 55, delete "if" and substitute --of--.

Signed and Sealed this

Fifteenth Day of February 1977

[SEAL]

Attest:

RUTH C. MASON
*Attesting Officer*

C. MARSHALL DANN
*Commissioner of Patents and Trademarks*